(12) United States Patent
Xu et al.

(10) Patent No.: US 8,938,444 B2
(45) Date of Patent: Jan. 20, 2015

(54) TECHNIQUES FOR EXTERNAL APPLICATION-DIRECTED DATA PARTITIONING IN DATA EXPORTING FROM A DATABASE MANAGEMENT SYSTEM

(75) Inventors: Yu Xu, Burlingame, CA (US); Olli Pekka Kostamaa, Santa Monica, CA (US)

(73) Assignee: Teradata US, Inc., Dayton, OH (US)

( * ) Notice: Subject to any disclaimer, the term of this patent is extended or adjusted under 35 U.S.C. 154(b) by 314 days.

(21) Appl. No.: 13/340,357

(22) Filed: Dec. 29, 2011

(65) Prior Publication Data

US 2013/0173595 A1 Jul. 4, 2013

(51) Int. Cl.
G06F 17/30 (2006.01)

(52) U.S. Cl.
USPC ........... 707/713; 707/716; 707/752; 707/753; 707/763

(58) Field of Classification Search
USPC .......................... 707/713, 716, 763, 718–719
See application file for complete search history.

(56) References Cited

U.S. PATENT DOCUMENTS

| | | | | |
|---|---|---|---|---|
| 5,813,005 | A * | 9/1998 | Tsuchida et al. ........................ | 1/1 |
| 5,864,842 | A * | 1/1999 | Pederson et al. ....................... | 1/1 |
| 6,212,516 | B1 * | 4/2001 | Kobayashi et al. .................... | 1/1 |
| 6,289,334 | B1 * | 9/2001 | Reiner et al. ........................... | 1/1 |
| 6,338,056 | B1 * | 1/2002 | Dessloch et al. .............. | 707/711 |
| 6,374,238 | B1 * | 4/2002 | Iwata et al. .................... | 707/769 |
| 6,421,665 | B1 * | 7/2002 | Brye et al. .............................. | 1/1 |
| 6,694,310 | B1 * | 2/2004 | Yu et al. ......................... | 707/718 |
| 6,694,312 | B2 * | 2/2004 | Kobayashi et al. .................... | 1/1 |
| 7,333,980 | B2 | 2/2008 | Bjornson et al. | |
| 7,447,679 | B2 | 11/2008 | Shankar et al. | |
| 7,562,090 | B2 * | 7/2009 | Lohman et al. ........................ | 1/1 |
| 7,680,761 | B2 * | 3/2010 | Zait et al. ....................... | 707/713 |
| 7,769,803 | B2 * | 8/2010 | Birdwell et al. .............. | 709/201 |
| 7,809,769 | B2 | 10/2010 | Butcher et al. | |
| 7,962,442 | B2 | 6/2011 | Barsness et al. | |
| 8,001,109 | B2 | 8/2011 | Lohman et al. | |
| 8,051,032 | B2 | 11/2011 | Cooper et al. | |
| 8,069,153 | B2 * | 11/2011 | Chan et al. .................... | 707/691 |
| 8,176,035 | B2 * | 5/2012 | Bhattacharjee et al. ...... | 707/713 |
| 8,244,713 | B2 * | 8/2012 | Petri ............................. | 707/713 |
| 8,290,947 | B2 * | 10/2012 | Brette et al. ................... | 707/728 |
| 8,321,402 | B2 * | 11/2012 | Reeb ............................. | 707/713 |
| 8,392,398 | B2 * | 3/2013 | Aggarwal et al. ............. | 707/713 |
| 2003/0028509 | A1 * | 2/2003 | Sah et al. .......................... | 707/1 |
| 2003/0217033 | A1 * | 11/2003 | Sandler et al. .................... | 707/1 |
| 2004/0243589 | A1 * | 12/2004 | Gu et al. ....................... | 707/100 |
| 2005/0131890 | A1 * | 6/2005 | Cruanes et al. .................... | 707/4 |
| 2006/0195416 | A1 * | 8/2006 | Ewen et al. ....................... | 707/2 |
| 2007/0203925 | A1 * | 8/2007 | Sandler et al. ................ | 707/100 |
| 2007/0239673 | A1 * | 10/2007 | Barsness et al. .................. | 707/3 |
| 2008/0005194 | A1 * | 1/2008 | Smolen et al. ................ | 707/202 |
| 2008/0162409 | A1 * | 7/2008 | Meijer et al. ...................... | 707/2 |
| 2008/0208822 | A1 * | 8/2008 | Bozkaya et al. .................. | 707/3 |

(Continued)

Primary Examiner — Hanh Thai
(74) Attorney, Agent, or Firm — Schwegman, Lundberg & Woessner, P.A.

(57) ABSTRACT

Techniques for external application-directed data partitioning in data exported from a parallel database management system (DBMS) are provided. An external application sends a query, a total number of requested access module processors (AMPs), and an application-defined data partitioning expression to the DBMS. The DBMS executes the query with the results vertical partitioned on the identified number of AMPs. Individual external mappers access their assigned AMPs asking for specific partitions that they are assigned to process the query results.

20 Claims, 4 Drawing Sheets

(56) References Cited

U.S. PATENT DOCUMENTS

| | | | |
|---|---|---|---|
| 2009/0030888 A1* | 1/2009 | Sahu et al. | 707/5 |
| 2009/0037365 A1* | 2/2009 | Sinclair et al. | 707/2 |
| 2009/0248617 A1* | 10/2009 | Molini | 707/2 |
| 2009/0287747 A1* | 11/2009 | Zane et al. | 707/204 |
| 2010/0094852 A1* | 4/2010 | Gupta et al. | 707/706 |
| 2010/0153963 A1* | 6/2010 | Kakarlamudi et al. | 718/105 |
| 2010/0205172 A1* | 8/2010 | Luk | 707/715 |
| 2010/0235344 A1* | 9/2010 | Chandrasekar et al. | 707/713 |
| 2010/0257198 A1* | 10/2010 | Cohen et al. | 707/770 |
| 2010/0318372 A1* | 12/2010 | Band et al. | 705/1.1 |
| 2010/0325124 A1* | 12/2010 | Wu et al. | 707/759 |
| 2011/0022582 A1* | 1/2011 | Unnikrishnan et al. | 707/715 |
| 2011/0040773 A1* | 2/2011 | Danesi et al. | 707/756 |
| 2011/0047172 A1* | 2/2011 | Chen et al. | 707/764 |
| 2011/0055243 A1* | 3/2011 | Kunnummal | 707/769 |
| 2011/0106767 A1* | 5/2011 | Zane et al. | 707/645 |
| 2011/0153594 A1* | 6/2011 | Hagenbuch et al. | 707/718 |
| 2011/0167091 A1* | 7/2011 | Bozkaya et al. | 707/803 |
| 2011/0167094 A1* | 7/2011 | Bozkaya et al. | 707/810 |
| 2011/0213802 A1* | 9/2011 | Singh et al. | 707/774 |
| 2011/0302583 A1* | 12/2011 | Abadi et al. | 718/102 |
| 2012/0047158 A1* | 2/2012 | Lee et al. | 707/759 |
| 2012/0072279 A1* | 3/2012 | Agarwal et al. | 705/14.43 |
| 2012/0078951 A1* | 3/2012 | Hsu et al. | 707/769 |
| 2012/0095987 A1* | 4/2012 | Cheng | 707/713 |
| 2012/0130986 A1* | 5/2012 | Abdellatif et al. | 707/718 |
| 2012/0130988 A1* | 5/2012 | Nica et al. | 707/718 |
| 2005/0187977 A1* | 12/2012 | Roh et al. | 707/713 |
| 2012/0310921 A1* | 12/2012 | Egan et al. | 707/718 |
| 2012/0317092 A1* | 12/2012 | Roh et al. | 707/713 |
| 2007/0094308 A1* | 6/2013 | Dusberger et al. | 707/747 |
| 2007/0208753 A1* | 6/2013 | Manzano Macho et al. | 707/718 |
| 2013/0151535 A1* | 6/2013 | Dusberger et al. | 707/747 |
| 2013/0159286 A1* | 6/2013 | Manzano Macho et al. | 707/718 |

* cited by examiner

TECHNIQUES FOR EXTERNAL APPLICATION-DIRECTED DATA PARTITIONING IN DATA EXPORTING FROM A DATABASE MANAGEMENT SYSTEM

BACKGROUND

After over two-decades of electronic data automation and the improved ability for capturing data from a variety of communication channels and media, even small enterprises find that the enterprise is processing terabytes of data with regularity. Moreover, mining, analysis, and processing of that data have become extremely complex. The average consumer expects electronic transactions to occur flawlessly and with near instant speed. The enterprise that cannot meet expectations of the consumer is quickly out of business in today's highly competitive environment.

Consumers have a plethora of choices for nearly every product and service, and enterprises can be created and up-and-running in the industry in mere days. The competition and the expectations are breathtaking from what existed just a few short years ago.

The industry infrastructure and applications have generally answered the call providing virtualized data centers that give an enterprise an ever-present data center to run and process the enterprise's data. Applications and hardware to support an enterprise can be outsourced and available to the enterprise twenty-four hours a day, seven days a week, and three hundred sixty-five days a year.

As a result, the most important asset of the enterprise has become its data. That is, information gathered about the enterprise's customers, competitors, products, services, financials, business processes, business assets, personnel, service providers, transactions, and the like.

Updating, mining, analyzing, reporting, and accessing the enterprise information can still become problematic because of the sheer volume of this information and because often the information is dispersed over a variety of different file systems, databases, and applications.

In response, the industry has recently embraced a data platform referred to as Apache Hadoop™ (Hadoop™). Hadoop™ is an Open Source software architecture that supports data-intensive distributed applications. It enables applications to work with thousands of network nodes and petabytes (1000 terabytes) of data. Hadoop™ provides interoperability between disparate file systems, fault tolerance, and High Availability (HA) for data processing. The architecture is modular and expandable with the whole database development community supporting, enhancing, and dynamically growing the platform.

However, because of Hadoop's™ success in the industry, enterprises now have or depend on a large volume of their data, which is stored external to their core in-house database management system (DBMS). This data can be in a variety of formats and types, such as: web logs; call details with customers; sensor data, Radio Frequency Identification (RFID) data; historical data maintained for government or industry compliance reasons; and the like. Enterprises have embraced Hadoop™ for data types such as the above referenced because Hadoop™ is scalable, cost efficient, and reliable.

Furthermore, in-database analytics is getting popular because data computation is being moved closer to the data. As a result, there are increasing customer demands to export data warehouse (parallel DBMS) data to external servers where complicated data analysis, such as graph analysis can be performed. A popular trend is to use Hadoop™ MapReduce™ customized modules to perform data analysis on exported data. A particular problem in exporting data to a parallel computing platform such as Hadoop™ is that existing DBMS's currently do not have the functionality/infrastructure to support application-directed data partition in the exporting process. For example, a transaction table in a DBMS might be physically partitioned by transaction identifier. A Hadoop™ application might want to start up multiple tasks to analyze the transaction history by area (zip code), such that each MapReduce™ task receives the complete transactions for any zip code it sees and then performs some application-specific analysis.

The following describes two current possible solutions used and in the industry and which are not efficient.

A first approach is to export the transaction table to the Hadoop™ system as a HDFS (Hadoop™ Distributed File System (DFS)) file and then run a Hadoop™ job, which manually partitions data by zip code to perform a desired analysis. Basically, mappers read the data and partition them by zip code, and reducers perform the analysis. This approach requires physical data movement in the Hadoop™ system and often is not what customers want from a DBMS's solution, since they want simplified application logic.

The second approach is really streamlined version of the first approach. It uses mappers to directly talk to the DBMS and retrieve data. In the ideal case, where the transaction table is already a Partitioned Primary Index (PPI) table partitioned by zip code, then each mapper can directly send Structured Query Language (SQL) queries to the DBMS to retrieve some partitions. Therefore, no data redistribution is needed on the Hadoop™ side and the mappers themselves can perform the same analysis as is done by the reducers in the first approach. However, this still uses the horizontal partition approach and does not scale as well as a vertical partitioning based approach. Furthermore, when the transaction table is not a PPI table, or if it is a PPI table not partitioned by zip code, each mapper still needs to either retrieve some portion of the transaction data and then redistribute the data by zip code to reducers, or the mappers can request the DBMS to create a new PPI table partitioned by zip code to avoid data redistribution in the Hadoop™ system. Either way, the processing is not efficient.

SUMMARY

In various embodiments, techniques for external application-directed data partitioning in data exported from a DBMS are presented. According to an embodiment, a method for external application-directed data partitioning on data exported from a DBMS is provided.

Specifically, a query is obtained and a total number of access module processors (AMPs) available on a DBMS are acquired. Next, a data partitioning expression is defined and that is for vertical partitioning query results on the AMPs by the DBMS when the query is processed by the DBMS. Finally, the query, the total number of AMPs, and the data partitioning expression are submitted to the DBMS for execution.

DETAILED DESCRIPTION

Initially for purposes of illustration and comprehension and before the FIGS. are discussed, some context and examples are presented to highlight and illustrate the techniques being presented herein and below.

As will be demonstrated more completely herein and below, the techniques presented offer new and efficient approaches that allow a DBMS to export data in such a way that satisfies application-specific requirements of data locality. The approach works not only for Hadoop™ based applications, but for any applications, which utilize multiple parallel software processes to retrieve and work on data warehouse (parallel DBMS) data.

The approach presented herein simplifies the computation at the Hadoop™ side (external DFS program side), since data is partitioned and sent to the mappers in an application desired way. The basic idea is to enhance a vertical partitioning based approach described by introducing application-specified data vertical partitioning conditions at the DBMS side. The same transaction table example presented in the background section is used here to describe how the sample situation is handled in a new and novel manner with the approaches presented.

Figure 1A:
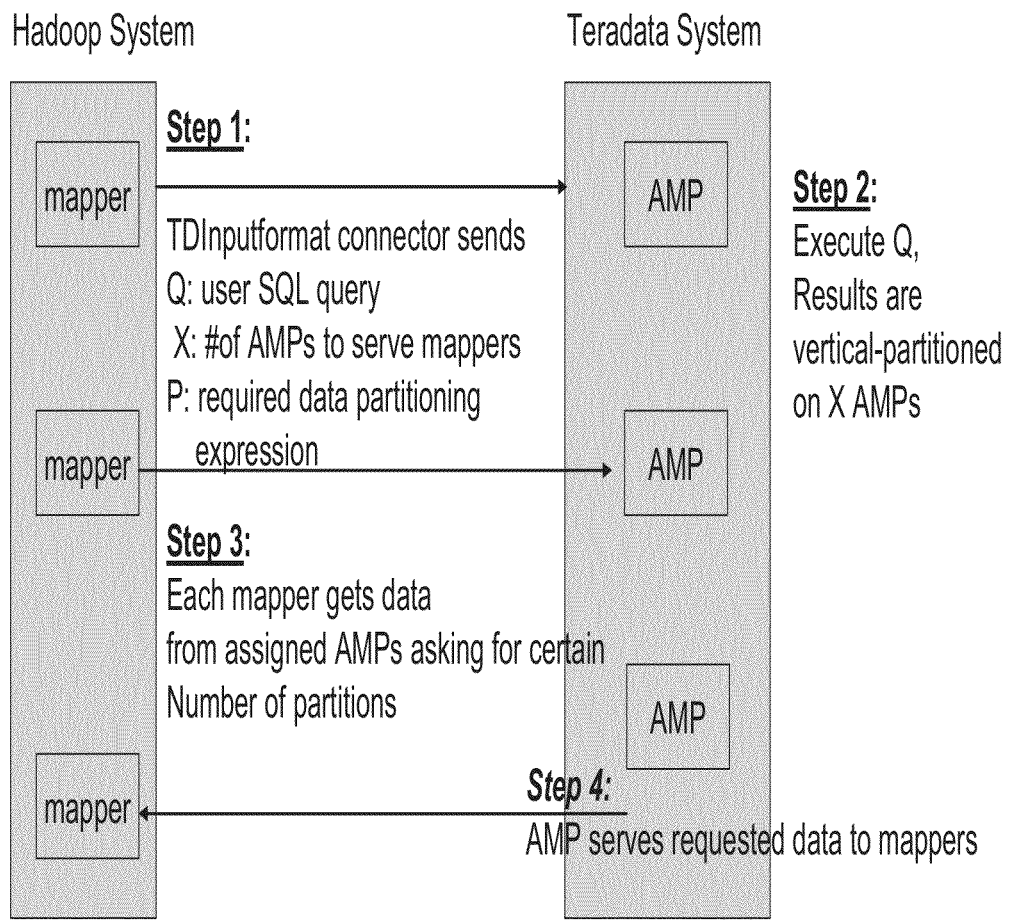
FIG. 1A is a diagram depicting a process flow for an external application-directed data partitioning on data exported from a DBMS for a sample scenario, according to an example embodiment.

For a SQL query, which is not a single base table retrieval, the following steps are performed (as shown in the FIG. 1A for purposes of illustration).

1) The Hadoop™ client provided as DBMSInputFormat sends an SQL query Q; the data partition condition specified by application P (which is by zip code in this example), and the total number of AMPs (X) to be used to serve the Mappers (customized MapReduce™ functions). X is a tunable/customizable parameter by applications and is not more than the total number of AMPs in the DBMS system.

2) The SQL query is executed in parallel as usual, but the final results are range-partitioned and sorted by an application-specified condition P (which is by zip code in this example) and the results are only stored on X AMPs, which may not be all AMPs.

3) Each mapper has been assigned (by the DBMSInputFormat module) a particular AMP or a subset of AMPs from which it should retrieve data. Each mapper requests data only from its assigned AMP(s).

4) Each AMP knows the total number partitions in the final result stored on it and knows the number of AMPs.

5) Finally the spooled query results are deleted after the job is completed successfully.

Currently DBMS's do not support vertically partitioning of a table or query result. However, herein the vertical partition is achieved by the following workaround: a PPI table is created to store the query result and use the user-provided partitioning condition as both the Primary Index (PI) column (primary index column used for data partitioning across AMPs) and also as a partition expression used to physically sort and store data on each AMP. The reason the user-provided partitioning condition is used as the PI column in the resulting PPI table is that for a particular zip code assigned to a mapper, that mapper just needs to communicate with one AMP not all AMPs to achieve the goal of vertical data partitioning.

There are three possible cases in terms of the number of AMPs and Hadoop™ (external DFS) mappers ($<, =, >$).

In Step 2, the results of the user query are stored in a temporary table to support mapper/client process failure cases. Therefore, whenever a mapper fails, the user query does not need to be re-executed. If client/mapper failure is not considered, the query results can be streamed directly to mappers without materializing the query results in temporary table first. However, then any mapper failure requires the re-execution of the query. Also, each mapper gets only all the data it is assigned from AMPs but not sorted (in zip code for the ongoing example scenario). Thus, each mapper has the additional responsibility to merge-sort the data it receives from data warehouse (parallel DBMS). However, no reducers or across mapper data transfer is needed.

If the user query Q simply retrieves a base table's data and if the vertical-partition based approach is applied, the above steps work correctly. Another alternative works as follows. No intermediate temporary table is used and all AMPs are used to send data to each mapper depending on a pre-computed mapping between the values of partition expressions on the data and the mappers. However, the issue is the same as discussed above. A mapper failure requires a full table scan of the base table on all AMPs while the approach discussed in above does not require a full table and all AMP operation.

One main advantage of the approach is that customer requirements can be met on application-specified data partition in exporting data warehouse data efficiently and can efficiently tolerate customer application restarts.

Figure 2:
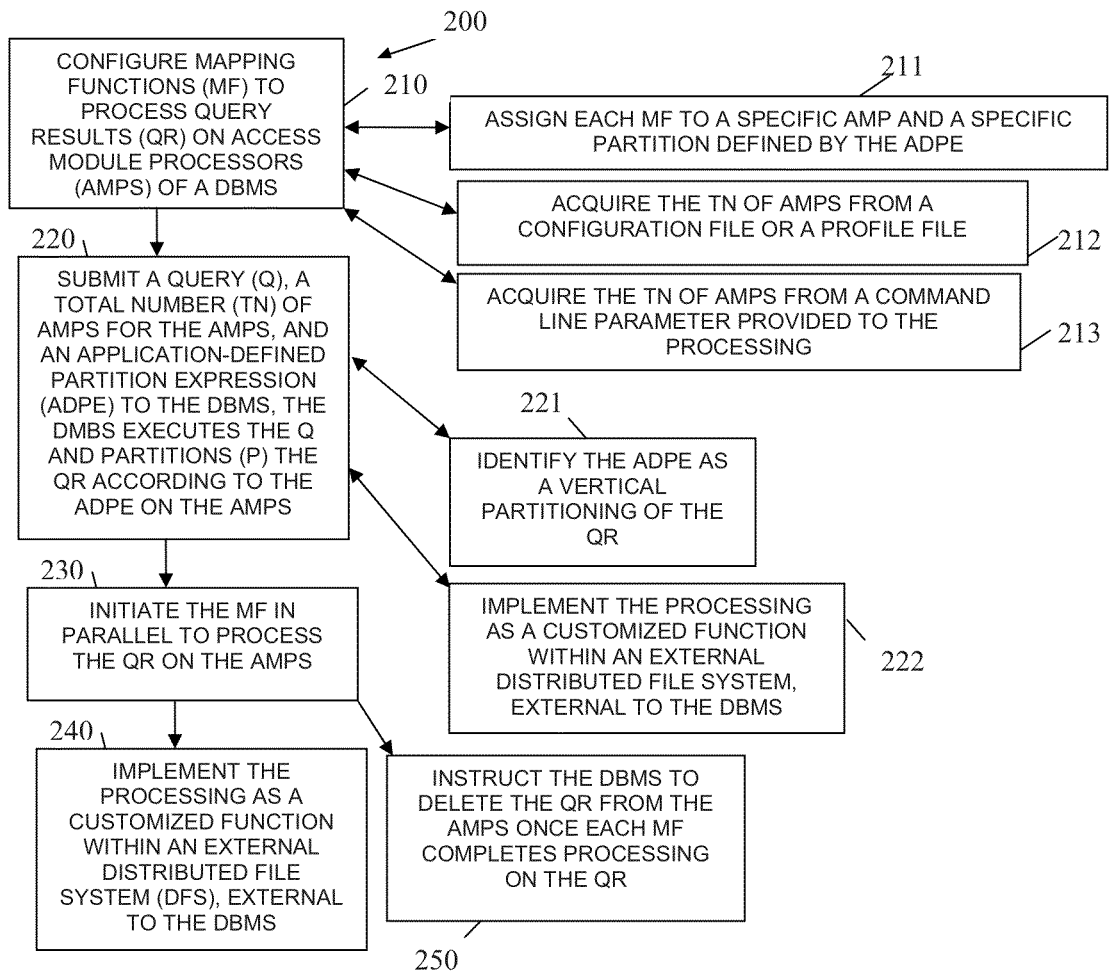
FIG. 2 is a diagram of another method for external application-directed data partitioning on data exported from a DBMS, according to an example embodiment.
Figure 3:
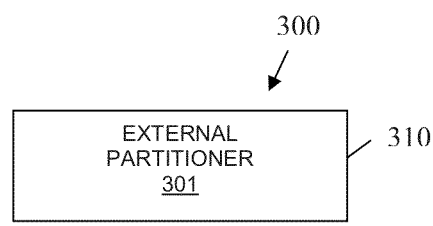
FIG. 3 is a diagram of an external application-directed data partitioning system, according to an example embodiment.

With the above detail presented, various embodiments are now presented with the discussion of the FIGS. 1A, 2, and 3.

Figure 1B:
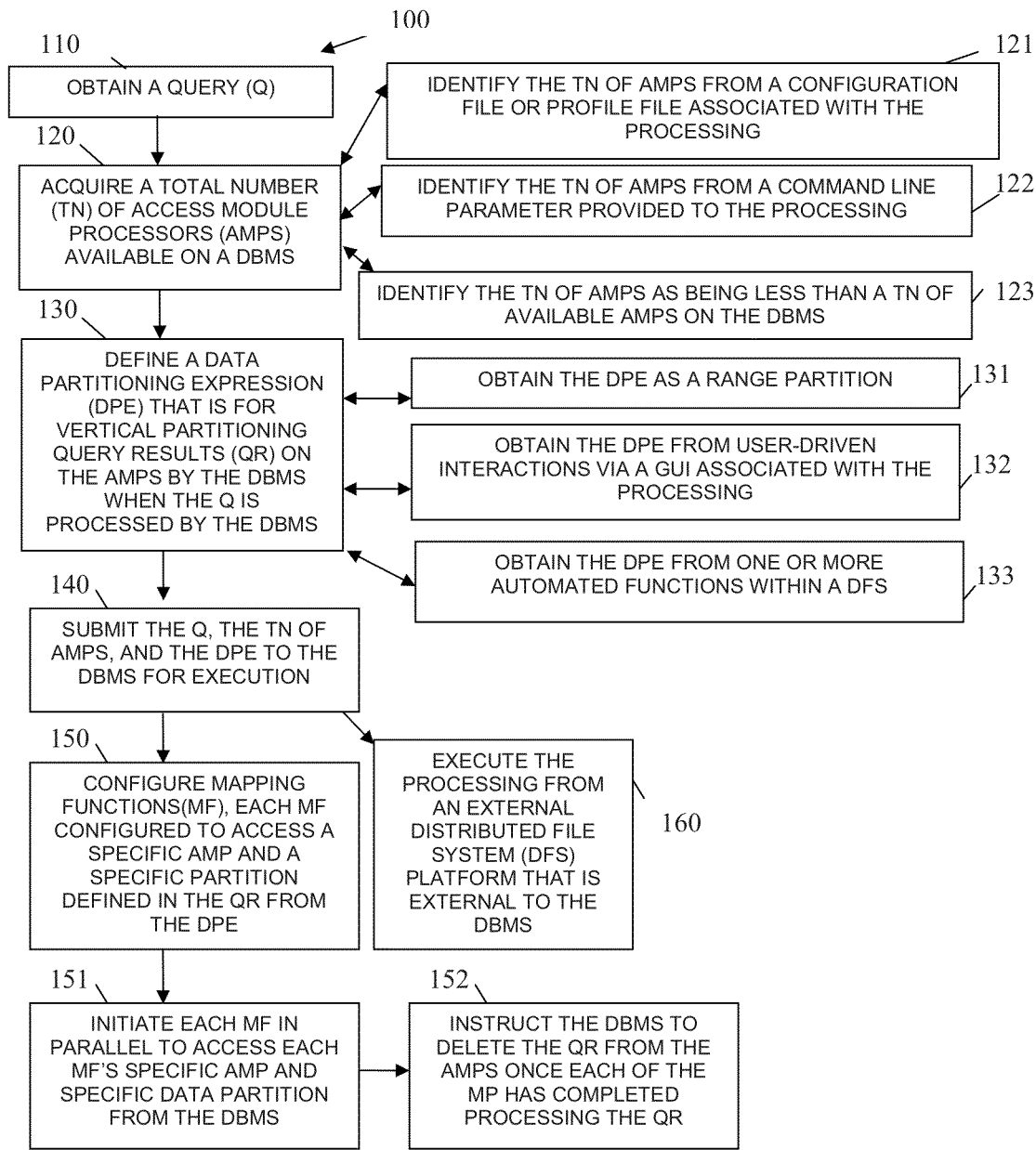
FIG. 1B is a diagram of a method for external application-directed data partitioning on data exported from a DBMS, according to an example embodiment.

FIG. 1B is a diagram of a method 100 for external application-directed data partitioning on data exported from a DBMS, according to an example embodiment. The method 100 (hereinafter "external partitioner") is implemented as instructions within a non-transitory computer-readable storage medium that execute on one or more processors, the processors specifically configured to execute the external partitioner. Moreover, the external partitioner is programmed within a non-transitory computer-readable storage medium. The external partitioner is also operational over a network; the network is wired, wireless, or a combination of wired and wireless.

The external partitioner presents another and in some ways an enhanced processing perspective to that which was discussed and shown above with respect to the FIG. 1A.

At 110, the external partitioner obtains a query.

At 120, the external partitioner acquires a total number of AMPs available on a DBMS.

According to an embodiment, at 121, the external partitioner identifies the total number of AMPs from a configuration file or profile file associated with the external partitioner.

In another case, at 122, the external partitioner identifies the total number of AMPs from a command line parameter provided to the external partitioner when the external partitioner is initiated.

In yet another situation, at 123, the external partitioner identifies the total number of AMPs as being less than a total number of available AMPs on the DBMS. So, the total number of AMPs on the DBMS does not have to be used; in fact, the number of AMPs may correspond to a total number of mapping functions (discussed below). In cases where the total number of AMPs is less than the total number of mapping functions, then each mapping function may access just specific data on that AMP, such that no two mapping functions process the same aspect of the query results.

At 130, the external partitioner defines a data partitioning expression that is for vertical partitioning of query results on the AMPs by the DBMS when the query is processed by the DBMS. The data partitioning expression is defined external to the DBMS and exists within the processing environment of the external partitioner, which is external and in a different processing environment from that of the DBMS.

According to an embodiment, at 131, the external partitioner obtains the data partitioning expression as a range partition.

In another situation, at 132, the external partitioner obtains the data partition expression from user-driven interactions via a GUI associated with the external partitioner.

In still another situation, at 133, the external partitioner obtains the partition expression from one or more automated functions within an external DFS.

At 140, the external partitioner submits the query, the total number of AMPs, and the data partitioning expression to the DBMS for execution.

According to an embodiment, at 150, the external partitioner configures mapping functions. Each mapping function is configured to access a specific AMP and a specific partition defined in the query results from the data partitioning expression.

Continuing with the embodiment of 150 and at 151, the external partitioner initiates each mapping function in parallel to access each mapping function's specific AMP and specific data partition from the DBMS.

Still continuing with the embodiment of 151 and at 152, the external partitioner instructs the DBMS to delete the query results from the AMPs once each of the mapping functions has completed processing the query results.

In yet another embodiment, at 160, the external partitioner executes from an external DFS platform that is external to the DBMS.

FIG. 2 is a diagram of another method 200 for external application-directed data partitioning on data exported from a DBMS, according to an example embodiment. The method 200 (hereinafter "application-directed partition manager") is implemented as instructions within a non-transitory computer-readable storage medium that execute on one or more processors, the processors specifically configured to execute the application-directed partition manager. Moreover, the application-directed partition manager is programmed within a non-transitory computer-readable storage medium. The application-directed partition manager is also operational over a network; the network is wired, wireless, or a combination of wired and wireless.

The application-directed partition manager presents another processing perspective to that which was shown above with respect to the FIGS. 1A and 1B.

At 210, the application-driven partition manager configures mapping functions to process query results on AMPs of a DBMS.

According to an embodiment, at 211, the application-driven partition manager assigns each mapping function to a specific AMP and a specific partition defined by the application-driven partition expression.

In an embodiment, at 212, the application-driven partition manager acquires the total number of AMPs from a configuration file or a profile file.

In still another embodiment, at 213, the application-driven partition manager acquires the total number of AMPs from a command line parameter provided to the application-driven partition manager.

At 220, the application-driven partition manager submits a query, a total number of AMPs for the AMPs, and an application-defined partition expression to the DBMS; the DMBS executes the query and partitions the query results according to the application-defined partition expression on the AMPs.

According to an embodiment, at 221, the application-driven partition manager identifies the application-driven partition expression as a vertical partitioning of the query results.

At 230, the application-driven partition manager initiates the mapping functions in parallel to process the query results on the AMPs.

In an embodiment, at 231, the application-driven partition manager is implemented as a customized function within an external DFS, external to the DBMS.

In still another case, at 232, the application-driven partition manager instructs the DBMS to delete the query results from the AMPs once each mapping function completes processing on the query results.

FIG. 3 is a diagram of an external application-directed data partitioning system 300, according to an example embodiment. Components of the external application-directed data partitioning system 300 are implemented as executable instructions within a non-transitory computer-readable storage medium that execute on one or more processors, the processors specifically configured to execute the external application-directed data partitioning system 300. Moreover, the external application-directed data partitioning system 300 is programmed within a non-transitory computer-readable storage medium. The external application-directed data partitioning system 300 is also operational over a network; the network is wired, wireless, or a combination of wired and wireless.

The external application-directed data partitioning system 300 implements, inter alia, the processing shown above with respect to the FIGS. 1A, 1B, and 2.

The external application-directed data partitioning system 300 includes an external partitioner 301.

One or more processors of an external DFS are configured with the external partitioner 301. The external partitioner 301 resides in a non-transitory computer-readable medium that executes on the one or more processors. Example processing associated with the external partitioner 301 is presented above with respect to the FIGS. 1A, 1B, and 2.

The external partitioner 301 is configured to assigning mapping functions to specific access module processors (AMPs) of a DBMS and to process a specific partition of query results housed on that AMP. Moreover, the external partitioner 301 is configured to submit a query, a total number of AMPs, and a partition expression to the DMBS; the DBMS executes the query and partitions the query results according to the partition expression in the AMPs.

According to an embodiment, the external partitioner 301 is configured to initiate each of the mapping functions in parallel to process the query results on each mapping function's specific assigned AMP and on each mapping function's specific assigned partition.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by one or more processors, the processors configured to execute the method, comprising:

obtaining a query;

acquiring a total number of access module processors (AMPs) available on a database management system (DBMS);

defining a data partitioning expression that is for vertical partitioning of query results on the AMPs by the DBMS when the query is processed by the DBMS, and using the data partitioning expression as both a primary index column for partitioning the query results across the AMPs and for sorting and storing the query results on each of the AMPs;

including a process for creation of a temporary table to house the vertical partitioned query results when the query is executed in order to support failure processing when a particular AMP fails during query processing; and submitting the query, the total number of AMPs, and the data partitioning expression to the DBMS for execution.

2. The method of claim 1 further comprising, configuring mapping functions, each mapping function configured to access a specific AMP and a specific partition defined in the query results from the data partitioning expression.

3. The method of claim 2 further comprising, initiating each mapping function in parallel to access each mapping function's specific AMP and specific data partition from the DBMS.

4. The method of claim 3 further comprising, instructing the DBMS to delete the query results from the AMPs once each of the mapping functions has completed processing the query results.

5. The method of claim 1 further comprising, executing the method from an external distributed file system platform that is external to the DBMS.

6. The method of claim 1, wherein acquiring further include identifying the total number of AMPs from a configuration file or profile file associated with the method.

7. The method of claim 1, wherein acquiring further includes identifying the total number of AMPs from a command line parameter provided to the method when the method is initiated.

8. The method of claim 1, wherein acquiring further includes identifying the total number of AMPs as being less than a total number of available AMPs on the DBMS.

9. The method of claim 1, wherein defining further includes obtaining the data partitioning expression as a range partition.

10. The method of claim 1, wherein defining further includes obtaining the data partition expression from user-driven interactions via a graphical user interface associated with the method.

11. The method of claim 1, wherein defining further includes obtaining the partition expression from one or more automated functions within an external distributed file system.

12. A method implemented and programmed within a non-transitory computer-readable storage medium and processed by one or more processors, the processors configured to execute the method, comprising:

configuring mapping functions to process query results on access module processors (AMPs) of a database management system (DBMS);

submitting a query, a total number of AMPs for the AMPs, and an application-defined partition expression to the DBMS, the DBMS executes the query and partitions the query results according to the application-defined partition expression on the AMPs and using the application-defined partition expression as both a primary index column for partitioning the query results across the AMPs and for sorting and storing the query results on each of the AMPs;

housing the query results in the partitions in a temporary table to support failure processing when a particular AMP fails during processing of the mapping functions; and initiating the mapping functions in parallel to process the query results on the AMPs.

13. The method of claim 12, wherein configuring further includes assigning each mapping function to a specific AMP and a specific partition defined by the application-driven partition expression.

14. The method of claim 12, wherein configuring further includes acquiring the total number of AMPs from a configuration file or a profile file.

15. The method of claim 12, wherein configuring further includes acquiring the total number of AMPs from a command line parameter provided to the method.

16. The method of claim 12, wherein submitting further includes identifying the application-driven partition expression as a vertical partitioning of the query results.

17. The method of claim 12 further comprising, implementing the method processing as a customized function within an external distributed file system, external to the DBMS.

18. The method of claim 12 further comprising, instructing the DBMS to delete the query results from the AMPs once each mapping function completes processing on the query results.

19. A system, comprising:

one or more processors configured with an external partitioner residing in a non-transitory computer-readable medium that executes on the one or more processors;

wherein the external partitioner is configured to assigning mapping functions to specific access module processors (AMPs) of a database management system (DBMS) and to process a specific partition of query results housed on that AMP, and the external partitioner configured to submit a query, a total number of AMPs, and a partition expression to the DBMS, the DBMS executes the query and partitions the query results according to the partition expression in the AMPs and stores the query results in the partitions in a temporary table to support failure processing when a particular AMP fails during the mapping functions performed on the query results and the partition expression defines both a primary index column to partition the query results across the AMPs and to sort and store the query results on each of the AMPs.

20. The system of claim 19, wherein the external partitioner is configured to initiate each of the mapping functions in parallel to process the query results on each mapping function's specific assigned AMP and on each mapping function's specific assigned partition.

* * * * *